UNITED STATES PATENT OFFICE.

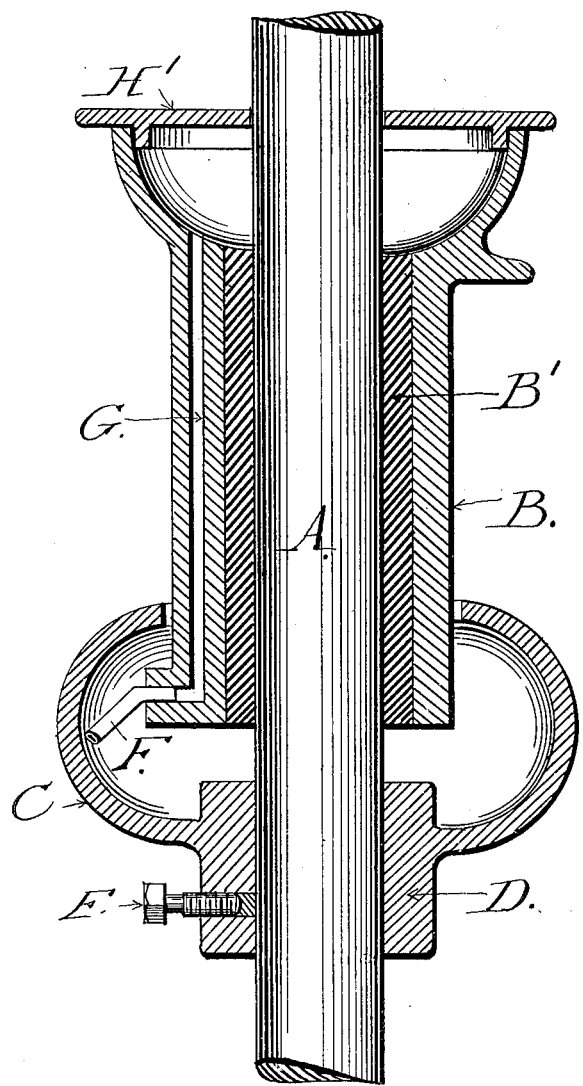

BYRON JACKSON, OF SAN FRANCISCO, CALIFORNIA.

LUBRICATOR.

SPECIFICATION forming part of Letters Patent No. 657,219, dated September 4, 1900.

Application filed September 7, 1899. Serial No. 729,676. (No model.)

*To all whom it may concern:*

Be it known that I, BYRON JACKSON, a citizen of the United States, residing in the city and county of San Francisco, State of California, have invented an Improvement in Lubricators; and I hereby declare the following to be a full, clear, and exact description of the same.

My invention relates to a device by which bearings of any description are constantly and automatically lubricated.

My invention comprises details of construction, which will be more fully explained by reference to the accompanying drawing, in which the figure illustrates a sectional view of a lubricator embodying my invention.

The object of my invention is to provide a positive means for automatically and continuously oiling and lubricating journals, shafts, loose pulleys, or other revoluble parts by pressure while in motion, such lubrication being effected directly by the revolution of the parts.

A is a shaft, which is herein shown as vertical.

B is a journal box or bearing in which the shaft is turnable, which may have the usual or any suitable antifrictional surface or surfaces, as at B'.

C is a cup or receptacle for oil having, preferably, a circular or rounded interior. At one end this cup or bowl has a flange or collar D, fitting the shaft, and a set-screw E secures it to the shaft, so that the cup is revoluble with the shaft. The other end of the cup is open, the opening having a sufficient diameter, as here shown, to extend over the journal or bearing B, with the edges of the cup approaching closely thereto without actual contact. Such a cup being filled with oil or other flowing lubricant, it will be manifest that when the shaft is in rotation the centrifugal force will throw the oil outward into the curved interior periphery of the cup. From this point the oil is forced by the velocity given it by the revolving cup and is led to the bearing by means of a tube F, one end of which is connected with the journal box or bearing, so as to convey the oil to the point where it is to be used. This tube F connects with a passage G, which extends upwardly through the bearing and discharges into a second cup H, formed integral or connected rigidly with the upper part of the journal-box. This second cup has an annular loose cover H', with a central opening through which the shaft loosely passes. The outer end of the pipe F is open and terminates close to the inner wall of the revoluble cup, so that the oil or lubricant which is thrown outwardly and carried around within the cup by its revolution will be forced by the velocity or pressure to enter the tube F and pass thence through the passage G to the point where it is discharged into the upper receptacle, from which receptacle it will flow through the bearing by gravitation and again return to the revoluble cup below. The inner end of the collar or flange which carries the cup projects upwardly within the cup, as shown, and thus forms an inner wall or retainer, around which the body of oil will rest whenever the parts are stationary. When the shaft and cup are revolving, the centrifugal force throws the oil out into the inner wall, where it remains in a comparatively thin sheet, and as before described, the motion and pressure will cause it to flow through the tube and passage to the bearing, whence it again returns between the parts of the bearing to the cup, thus continually circulating without waste.

Having thus described my invention, what I claim as new, and desire to secure by Letters Patent, is—

An improved lubricator including a revoluble shaft, a flange or collar secured thereto and formed with a cup having a rounded interior and having one end open, a second cup surrounding the shaft and a bearing formed rigid therewith and entering the open end of the first-named cup, but without contacting therewith, and having a passage through it, an annular loose cover for the second cup through which the shaft loosely passes, and a bent tube having its open end lying close to the inner wall of the first-named cup.

In witness whereof I have hereunto set my hand.

BYRON JACKSON.

Witnesses:
JOHN W. NYE,
LEE D. CRAIG.